Patented Dec. 1, 1942

2,303,917

UNITED STATES PATENT OFFICE 2,303,917

LUMINESCENT MATERIAL

Herbert J. Dietz, Rochester, N. Y., assignor to Eastman Kodak Company, Rochester, N. Y., a corporation of New Jersey No Drawing. Application April 1, 1942, Serial No. 437,197

12 Claims. (Cl. 250—81)

This invention relates to luminescent screens and compounds and particularly to such material emitting fluorescent rays of violet or ultraviolet wave length and its uses.

It has been known hitherto that barium fluoride and barium chloride have fluorescent properties in the violet and ultraviolet region. Barium chloride, when heat treated, has good fluorescent and phosphorescent properties, but is water soluble and water destroys its luminescent properties. It has now been discovered that intermediate compounds between barium fluoride and barium chloride when suitably prepared are luminescent and, in particular, on approaching the molar composition BaFCl, the luminescence under X-rays approaches a maximum; that is, an intensity greater than for compositions having other proportions of fluorine and chlorine or than either halide alone. Barium fluorochloride has high phosphorescence and has, therefore, only limited usefulness in medical work where it is desirable that the sensitive plate and screen be separated and the film developed as soon as possible after exposure. It has only limited utility in a visual fluorescent screen since the luminescent rays emitted by it are predominantly in the ultraviolet or invisible portion of the spectrum. It is, however, outstandingly useful where the screen can remain in contact with the sensitive layer, as, for instance, in the processes described in the pending applications of Gerould T. Lane and Clarence L. A. Wynd, Serial No. 407,959, filed July 23, 1941, and Serial No. 411,968, filed September 23, 1941, where a design comprising fluorescent and non-fluorescent areas is excited by X-rays and by fluorescence and phosphorescence imprints a developable image on a photographic plate.

My invention comprises luminescent layers, lacquers, compositions and screens in which barium fluorochloride is the predominant luminescent material.

I will now give several methods by which barium fluorochloride may be prepared in a form in which it is highly efficient.

In all of the examples, proportions given are by weight and preferred temperatures and times given are for batches weighing twenty pounds. The times given are subject to greater variation than the temperatures. In general, for the best results, a temperature of the order of 1500° F. for the principal heating period is recommended, the heating period being of the order of three hours for a twenty pound batch. A longer time would be necessary with lower temperatures or with larger batches and, conversely, a shorter time with higher temperatures or smaller batches; but higher temperatures yield larger crystals which are less desirable for the purpose contemplated.

With a quite small batch, say five pounds, a half hour at 1500° F. would produce definitely useful results.

Example 1

| | Parts |
|---|---|
| Barium chloride, $Ba_2Cl.2H_2O$ | 27 |
| Potassium fluoride, KF | 6 |

Twenty pounds of the above in fine crystalline form is mixed dry and heated in a clay or porcelain crucible or other suitable vessel at 1500° F. for two hours. While temperature and time are not critical to produce a material having fluorescence, the crystal size and intensity of fluorescence are influenced. With a batch of the above size variations of temperature outside of the range between 1400° F. and 1700° F. yield noticeably poorer material. The maximum size of the particles under the conditions given above is 70 microns.

After being heated as above, the material is cooled, the flux dissolved out with water and the crystals washed by decantation and dried in an oven at moderate temperature.

The parts of barium chloride in the above formula may be varied from 24 to 36, but all over 24 parts to the 6 parts of potassium chloride acts as a flux. If less than 24 parts is used, a mixture of barium fluoride and barium fluorochloride results.

Example 2

This example is a procedure for preparation of a composition having an excess of fluorine and yielding mainly BaFCl but also a small proportion of $Ba_2F_2$.

| | Parts |
|---|---|
| Barium chloride, $BaCl_2.2H_2O$ | 26 |
| Sodium fluoride, NaF | 8 |

This mixture is fired for one hour at 1100° F., but this temperature is not critical. If subjected to heat as high as 1300° F., the materials fuse and become useless for purposes herein described. This preliminary heat treatment, however, prepares it for the higher temperatures later used. It is then washed by decantation and dried. At this point the material has low luminescent properties. There is some uncertainty as to the precise chemical structure of the material at this point. It is then refired for 3 hours at 1500° F.

together with 26 to 40 percent by weight of a mixture of equal parts by weight of barium chloride ($BaCl_2.2H_2O$) and potassium chloride, the amount added not being critical, as its principal function is to act as a flux. In general, the higher the temperature of firing the less flux is required to yield a suitable product. The amount used is adjusted to yield a product with desirable physical properties as well as good luminescent qualities. Other non-reactive fluxes may be substituted for potassium chloride, such as other soluble halides.

The soluble substances are then dissolved by water and the material washed by decantation and dried in an oven.

Analysis of material prepared in the manner just described shows that it consists of from 90 to 98 percent barium fluorochloride (BaFCl) and from 10 to 2 percent barium fluoride ($BaF_2$).

*Example 3*

This example, while the work of my co-worker, Otto Uhle, in whose name a copending application thereon, Serial No. 437,209, is filed concurrently herewith, is given as a further and in some respects a preferred method of obtaining barium fluorochloride giving high intensity of luminescence.

| | Parts |
|---|---|
| Barium chloride, $BaCl_2.2H_2O$ | 40 |
| Barium fluoride, $BaF_2$ | 20 |
| Potassium chloride, KCl | 9 |

These ingredients in fine crystals may be mixed wet or dry. If mixed wet, the mixture should, before firing, be dried in an oven. The dry mixture is then heated at 1500° F. for three hours. While temperature and time of heating may be varied considerably and luminescent compounds obtained, rather close control and adherence to the time and temperature mentioned seems to be necessary to secure the maximum intensity. Highly useful results may, however, be obtained between a temperature of 1400° F. for five hours and a temperature of 1700° F. for two hours, and fair results between 1300° F. and 1400° F. for a more extended period, and even up to 1800° F. These ranges also apply to Example 2.

*Example 4*

Barium fluorochloride may be prepared by ordinary known wet methods, dried and heated with a flux such as potassium or sodium chloride under temperatures and times in the ranges indicated in the above examples.

The luminescent properties of barium fluorochloride when prepared by any of the above preferred methods are apparent when compared with a known fluorescent material such as calcium tungstate. Of the light emitted by barium fluorochloride, qualitative experiments indicate that approximately 19% is of wave length below 3600 Angstrom units, 76% between 3000 and 4200 A. units and 5% above 4200 A. Of the light emitted by calcium tungstate, 13% is of wave length below 3600 Å.; 55% between 3600 and 4200 Å. and 32% above 4200 Å. The visible luminescence is violet.

It is not certain whether the compound prepared in the manner described is $BaCl_2.BaF_2$ or BaFCl, but when I use the term barium fluorochloride I include and refer to the material described, whichever its actual chemical structure.

I have further found that strontium fluorochloride produced by methods analogous to or substantially the same as those described above has useful fluorescent properties, but I have not found this to be true of other fluorochlorides, and the barium compound is very definitely superior to the strontium. In Example 1, 16 parts of strontium chloride are heated with 6 parts of the potassium fluoride, the other details being the same. The crystal size is from 5 to 75 microns.

For the manufacture of an intensifying screen the dry powder is dispersed in a suitable lacquer, varnish or aqueous dispersed colloid and coated on paper, metal or other support, or may be coated as a sub layer between a support and a photographic emulsion or as a removable layer over a photographic emulsion.

Examples of lacquers are the following:

*Formula 1*

| | Parts |
|---|---|
| Barium fluorochloride | 30 |
| 10% cellulose nitrate in butyl acetate | 15 |
| Triacetin | 1 |

Other solvents and plasticizers may be used. For instance, five parts of the butyl acetate and one part of butyl phthalate may be substituted for triacetin in the above example.

*Formula 2*

| | Parts |
|---|---|
| Barium fluorochloride | 30 |
| 10% cellulose acetate-butyrate in equal parts of acetone and methyl cellulose acetate | 15 |

To this may be added a suitable plasticizer, such as one part of butyl phthalate.

These lacquers are useful in the processes described in the Lane and Wynd applications.

As has been noted above, materials such as barium fluorochloride having considerable afterglow or phosphorescence are relatively unsuited for use in movable X-ray intensifying screens because any displacement of screen relative to sensitive surface introduces diffusion. But, if the fluorescent-phosphorescent material be firmly adherent to the sensitive layer as an overcoating, the reinforcing effect of phosphorescence is conserved without loss of definition. In such a case the dry powder is carried in a binder which is soluble in one or more of the photographic processing baths, such as water alone, an alkaline developing bath, an acid fixing bath, or in a separate non-aqueous bath. Materials available for such use as a binder are methyl cellulose, hydrolyzed water-soluble cellulose acetate, water-soluble polyvinyl acetate, alkaline soluble polyvinyl phthalate, in each case the screening layer being coated from well known solvent solutions for the several materials.

If the screen is to remain in contact with the photographic layer for the purposes of the Lane and Wynd application Serial No. 411,968, or for other purposes, it may be coated on the support and the sensitive layer applied over it. For this purpose the luminescent screen layer is preferably made and applied as follows:

200 grams of gelatin are dissolved in a liter of water at approximately 40° C. and 500 grams of barium fluorochloride are added. This suspension is ground for 48 hours in a heated ball mill until the average particle size is 10 microns with a maximum particle size of 15 microns. This dispersion is then coated on a plain or baryta coated paper, film, metal or other support by usual procedure. The coating is so spread as to contain at least one decigram of barium fluorochloride per 6.25 square centimeters. A photographic emulsion is spread directly on this layer, either after it has been dried or after it has been set and before it is fully dried, and the coated element is then dried.

The examples of lacquer given above may also be used for this purpose or the barium fluorochloride may be dispersed in a 2% solution of gum tragacanth.

In the examples given above for density of coating, the barium fluorochloride would be that obtained by the preferred examples. If the temperatures and times are varied so as to yield a less efficient, but still useful, product a heavier coating would be necessary to obtain a comparably useful screen or coating.

I consider as included within my invention such modifications and equivalents as fall within the scope of the appended claims.

I claim:

1. A luminescent composition comprising as its predominant luminescent material a fluorochloride of the metal included in the class of barium and strontium and which has been heat treated at a temperature of the order of 1500° F.

2. A luminescent composition comprising as its predominant luminescent material a fluorochloride of the metal included in the class of barium and strontium and which has been heat treated at a temperature of the order of 1500° F. for a period of the order of three hours.

3. A luminescent composition comprising as its predominant luminescent material barium fluorochloride which has been submitted to heat of the order of 1500° F. for a period exceeding two hours.

4. A fluoroscent-phosphorescent screen comprising a sheet of supporting material and a layer of material thereon comprising barium fluorochloride as its predominant luminescent ingredient.

5. A fluorescent-phosphorescent screen comprising a sheet of supporting material and a layer of material thereon comprising as its predominant luminescent ingredient barium fluorochloride which has been submitted to heat of the order of 1500° F.

6. A fluorescent-phosphorescent screen comprising a sheet of supporting material and a layer of material thereon comprising as its predominant luminescent ingredient barium fluorochloride which has been submitted to heat of the order of 1500° F. for a period of the order of three hours.

7. A photographic element comprising a support, a photographically sensitive layer and a luminescent layer comprising as its predominant fluorescent material barium fluorochloride which has been subjected to heat of the order of 1500° F.

8. A photographic element comprising a support, a photographically sensitive layer and a luminescent layer comprising as its predominant fluorescent material barium fluorochloride which has been subjected to heat of the order of 1500° F. for a period of the order of three hours.

9. The method of preparing a material which is highly luminescent when activated by X-rays and which consists predominantly of barium fluorochloride that comprises mixing barium chloride with a soluble fluoride, the quantity of barium chloride being in excess of the molar requirements to produce barium fluoride and subjecting the resulting mixture to heat of the order of 1500° F.

10. The method of preparing a material which is highly luminescent when activated by X-rays and which consists predominantly of barium fluorochloride that comprises mixing barium chloride with a soluble fluoride, the quantity of barium chloride being in excess of the molar requirements to produce barium fluoride and subjecting the resulting mixture to heat of the order of 1500° F. for a period of time of the order of three hours.

11. The method of preparing a material which is highly luminescent when activated by X-rays and which consists predominantly of barium fluorochloride that comprises mixing barium chloride with a soluble fluoride, the quantity of barium chloride being in excess of the molar requirements to produce barium fluoride and subjecting the resulting mixture to heat within the range between 1300° F. and 1800° F. and for a period of time exceeding one hour.

12. The method of preparing a material which is highly luminescent when activated by X-rays and which consists predominantly of barium fluorochloride that comprises mixing barium chloride with a soluble fluoride, the quantity of barium chloride being in excess of the molar requirements to produce barium fluoride and subjecting the resulting mixture to heat within the range between 1400° F. and 1700° F. for at least two hours.

HERBERT J. DIETZ.

Certificate of Correction

Patent No. 2,303,917. December 1, 1942.

HERBERT J. DIETZ

It is hereby certified that error appears in the printed specification of the above numbered patent requiring correction as follows: Page 1, second column, line 40, for "$Ba_2F_2$" read $BaF_2$; and that the said Letters Patent should be read with this correction therein that the same may conform to the record of the case in the Patent Office.

Signed and sealed this 9th day of March, A. D. 1943.

[SEAL]

HENRY VAN ARSDALE,
*Acting Commissioner of Patents.*